Dec. 30, 1930.   H. B. GREENING ET AL   1,787,246
VARIABLE SPEED TRANSMISSION
Filed July 26, 1928   2 Sheets-Sheet 2

Inventors
Herald B. Greening
James W. Galloway

H. J. S. Dennison
Atty.

Patented Dec. 30, 1930

1,787,246

UNITED STATES PATENT OFFICE

HERALD B. GREENING, OF HAMILTON, ONTARIO, CANADA, AND JAMES W. GALLOWAY, OF DETROIT, MICHIGAN, ASSIGNORS TO GALLOWAY ENGINEERING COMPANY, LIMITED, OF HAMILTON, ONTARIO, CANADA

VARIABLE-SPEED TRANSMISSION

Application filed July 26, 1928. Serial No. 295,427.

The principal objects of the invention are, to provide a mechanism which will transmit torque to a driven shaft at variable speeds without at any time disconnecting the driving from the driven element, and to provide a very simple form of mechanism which will act with uniform precision and will be thoroughly reliable in its operation.

The principal feature of the invention consists in the novel construction and arrangement of parts, whereby a rotatable driving element is operatively connected with a plurality of reciprocable piston members which operate in cylinders connected with the driven member, and means is provided for regulating the relative movement of said co-operating elements.

Figure 1:
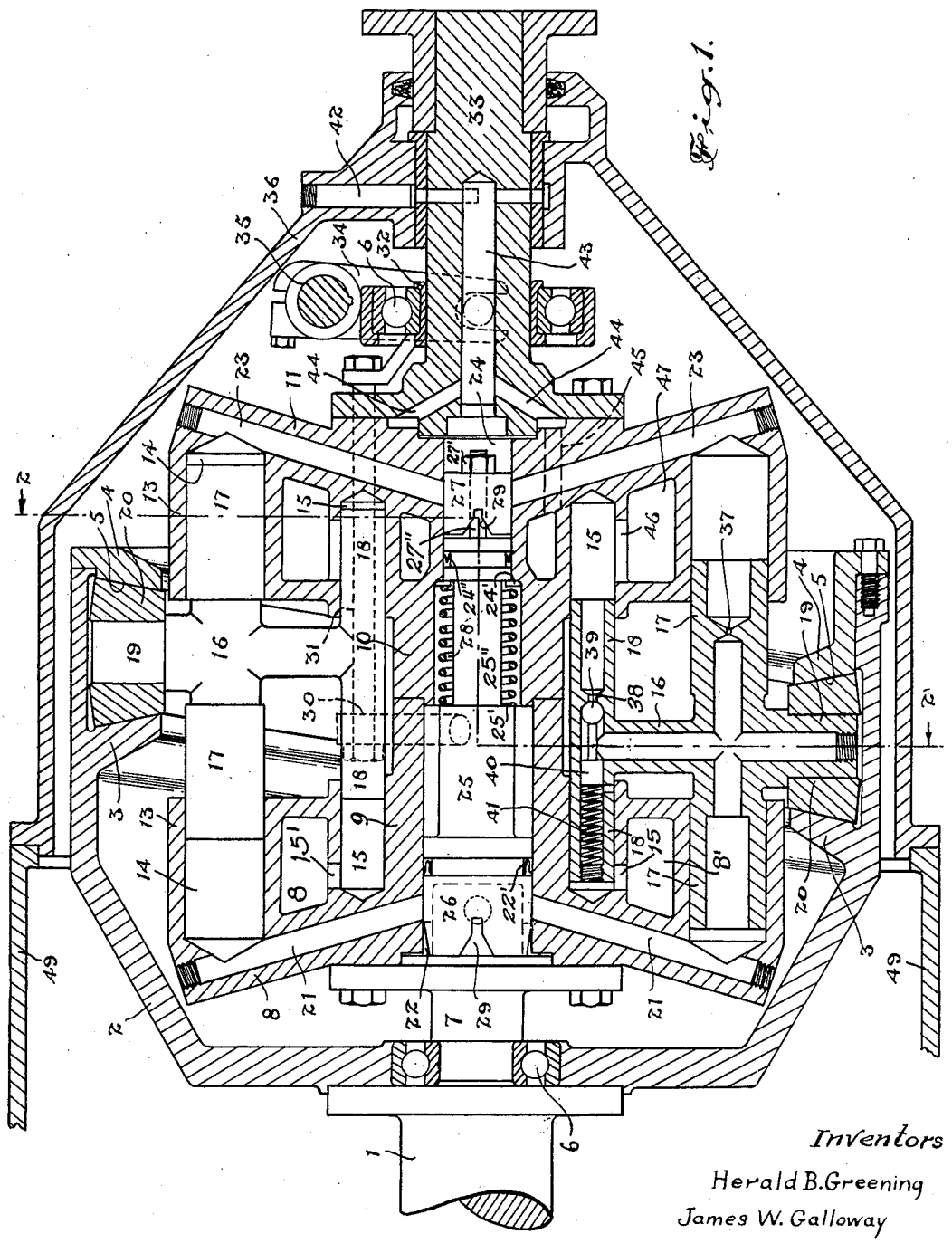

In the drawings, Figure 1 is a longitudinal mid-sectional view through our improved transmission device.

Figure 2:
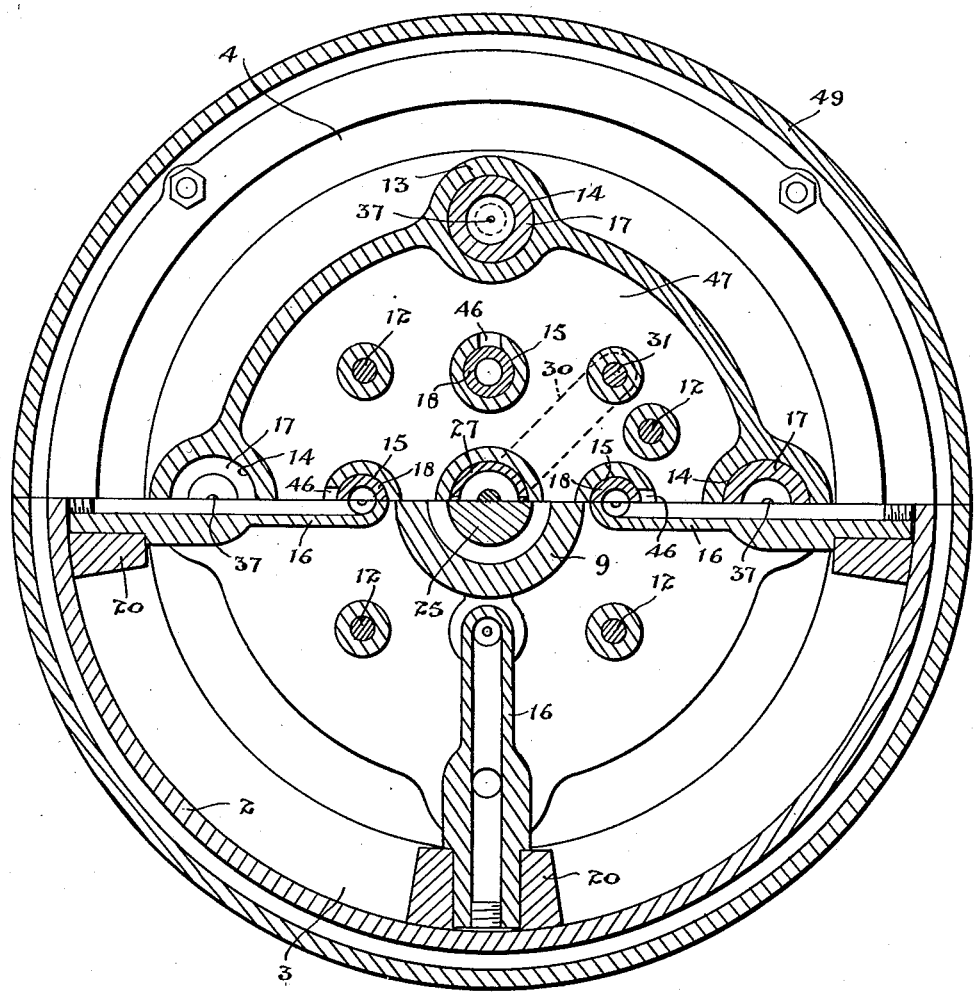

Figure 2 is a cross sectional view through the line 2—2 of Figure 1.

In the apparatus herein shown the driving shaft 1 has secured thereto a circular shell structure 2 which acts as a fly wheel.

The inner periphery of the shell structure 2 is provided with a flange 3 which is in the form of a cam to effect longitudinal displacement of the elements engaging the same.

A flange rim 4 is secured to the outer end of the member 2 and is provided with an inner flanged surface 5 corresponding with the flange 3 and forming a cam groove.

Mounted within the structure 2 is a rotatable element which is supported at one end upon a bearing 6 by the flanged stub shaft 7.

The section 8 of the rotatable element which is directly secured to the flange of the stub shaft 7 is formed with a central cylindrical portion 9 which engages and centers with the cylindrical portion 10 of the section 11 which corresponds with the section 8. These two members are held rigidly together by the tie rods 12.

The respective sections 8 and 11 are formed with the spaced outer flanged portions 13 in which are formed the outer cylinders 14 and the inner cylinders 15.

Each set of the inner and outer cylinders are arranged in radial co-relation.

A plurality of compound piston structures 16 are provided one for each radial group of inner and outer cylinders. These structures 16 are each provided with a pair of larger pistons 17 operating in the outer cylinders 14 and with a pair of smaller pistons 18 operating in the cylinders 15. All of the pistons 17 and 18 of each structure 16 are rigidly connected and a stud 19 forming part of the piston structure is provided with a roller 20 which extends into the cam groove and engages the flanges 3 and 5 so that rotation of the member 2 will cause the reciprocation of the piston members 17 and 18 in their respective cylinders.

In the section 8 the cylinders 14 are connected by the radial passages 21 with a centrally arranged cylinder 22 and in the section 11 the cylinders 14 are connected by the radial passages 23 to an axially disposed cylinder 24.

A plunger 25 is arranged within the axial cylindrical chamber formed in the centre of the members 8 and 11 and is provided with piston member 26 at one end operating in the cylinder 22.

A reduced extension 25" extends from the other end of the plunger 25 into the cylinder 24 and may either form a part of or be threaded into the plunger 25. A threaded stud 27" projects beyond the end of the reduced extension 25" and on this stud is supported the piston 27 and secured by the nut 27' the piston 27 operating in the cylinder 24.

The outer end of the reduced extension is enlarged to form a sliding fit in the cylinder 24 and is grooved to receive a pressure packing 24", the piston 26 being similarly grooved and provided with a suitable pressure packing 22'.

Each of the pistons 26 and 27 closes the radial passages 21 and 23 respectively, the plunger 25 being held to the closed position by the compression spring 28 arranged between the cylinder ends.

The spring 28 encircles the reduced plunger extension 25" and bears at one end on the shouldered portion 25' of the plunger and at the other end on the shoulder 24' of member 10 at the inner end of the cylinder 24.

Each of the pistons 26 and 27 is formed with notches 29 in the free ends which are adapted to co-operate with the radial passages 21 and 23 respectively.

The plunger 25 is adapted to operate automatically as will be hereinafter described but also is provided with a direct mechanical connection in the form of a stud 30 which may be threaded into or otherwise suitably secured thereto in the central cylindrical portion of the members 8 and 11.

The stud 30 is connected by a rod 31 to the slidable bearing sleeve 32 which is operated to move longitudinally on the shaft member 33 by a fork 34 mounted on a transverse stud 35 supported in a casing 36 which encloses the rotatable members.

It will be seen that by the rocking of the stud 35 the rod 31 will be operated to move the plunger longitudinally in its cylinders against the pressure of the spring 28 so as to open communication between the radial passages leading from the cylinders 14 to the central cylinders 22 and 24.

Each of the piston structures 16 is hollow and in the larger piston 17 a small metering hole 37 is provided to restrict a flow of oil through from one cylinder to the opposite one. The small pistons 18 are provided with an orifice 38 which is closed at the inner side by a ball valve 39 held to its seat by a plunger 40 engaging the compression spring 41.

In order to maintain a constant quantity of oil in the cylinders, oil is introduced from an external source through the hole 42, being supplied under pressure in any well known manner and passing through the passage 43 in the shaft 33 flows through the passages 44, 45 into the annular chamber 47 from whence it flows through the passages 46 past the ball valve 39 and fills up the cylinders 14 in members 8 and 11 by way of the passages in the piston structures. In this way the working pressure in the cylinders 14 will not back up to the supply since the valve 39 will prevent any back flow. Any loss of oil from the cylinders 14 is thus compensated.

The section 8 of the rotatable element is provided with an annular passage 8' between the cylinders 14 and 15 and each of the cylinders 15 is connected therewith by the passage 15' so that as the various pistons 18 are reciprocated in the cylinders 15 as hereinafter described the oil will be constantly displaced from the cylinders 15 in the member 8 into the annular passage 8' and from the annular passage 8' back into the cylinders 15 of member 8. A constant supply of oil is maintained in the annular passage 8' from the supply in the same manner as supplied to the cylinders 14 by way of valve 39 as described.

The pistons 18 operating in the cylinders 15 act as guide members to the main working pistons 17 preventing the rotation of the latter in their cylinders against the thrust caused by the rollers 20 in their contact with the cam and serve to support the rollers 20 in their true relation with the cam surfaces.

The shaft 33 is secured to the section 11 and the casing 36 in which the oil hole 42 is arranged encircles this shaft and encloses the whole mechanism, it being connected to the engine casing 49.

The piston ends of the plunger 25 normally close the radial passages 21 and 23 but one of the notches 29 in the piston 26 is slightly longer than the others and provides an opening to one of the passages 21 at all times. The other passages are normally closed so that no bye-passing of oil can occur. The piston 27 normally retains the radial passages 23 closed. The plunger 25 is therefore an unbalanced valve which tends to open as soon as any pressure is built up by the pistons 17.

The compression spring 28 operating against the plunger is graduated to resist such a pressure and it is so designed that as soon as the engine torque passes a predetermined point the valve pistons 26 and 27 will open the passages 21 and 23 so that the oil byepasses through the holes and reduces the speed of the driven end, keeping the engine torque constant which provides an automatic balancing of the driving and driven torques and therefore balances the speed of the two members. This automatic balancing may be used with or without a manual means of operating the plunger or manual means of operating the plunger may be used without the automatic balancing.

In manual control operation, the fork 34, by means of a suitable lever, operates through the connections described to mechanically shift the position of the plunger 25 to control the bye-passing of the oil through the passages 21 and 23 as described.

In the operation of the device it will be understood that the driving shaft rotates the fly wheel shell structure 2 carrying with it the cam flanges which engage the rollers 20 carried by the piston structures 16. This rotation causes a tendency to endwise movement of the pistons, but if the oil pressure against the pistons will not permit them to move, or will permit them to move with a limited movement, the sections 8 and 11 are carried around with the fly wheel.

When the plunger 25 is in a position closing the passages connecting the cylinders there will be no bye-passing of the oil and the maximum torque will be transmitted from the driving to the driven shaft driving in a 1 to 1 ratio, but if by reason of an overbalance of the load the spring 28 is compressed by the oil leakage through the open port or notch 29 to the plunger cylinder so that it uncovers other ports, or by reason of the manual operation of the plunger to uncover the ports of the passages 21 and 23 to allow the fluid to bye-pass, the driving member will rotate at a faster speed than the driven one.

The metering holes provided in the larger pistons are desirable in certain uses of this device to allow the bye-passing of oil in the event of a sudden increase of the torque of the driven member. This provision allows the oil to bye-pass to instantaneously and automatically allow the reduction of speed of the driven member.

It will be seen that the flow of oil through the metering holes will vary in proportion to the torque consequently the effective operation of the driving and driven members will be in proportion to the torque and after the speed ratio of the two members has been reduced they will automatically return to balance.

It is a very important feature of this invention that when it is operating at a 1 to 1 ratio there is no relative movement between the driving and driven members and the transmission fluid is at rest.

It will be understood from this description that the transmission provided may be very accurately controlled and also that the construction is extremely simple and compact and there are no delicate parts to get out of order.

Such a clutch device is applicable for use with numerous forms of mechanisms and is particularly applicable to the driving of motor cars where balanced torques are highly desirable.

What we claim as our invention is:—

1. In a variable speed transmission, a driving member having a cam, a driven member having a plurality of reciprocable members operatively engaging said cam and reciprocated thereby in a direction longitudinally of the axis of the driven member, a plurality of pistons carried by each of said reciprocable members, cylinders co-operating with said pistons, a fluid carried by the cylinders of the driven member and opposing the movement of said pistons, and means for controlling the bye-passing of said opposing fluid.

2. In a variable speed transmission, a driving member having a cam, a driven member having a plurality of opposed axially aligned cylinders arranged therein with their axes spaced parallel from the axis of said driven member, a plurality of reciprocable members arranged between said axially aligned cylinders and operatively engaging said cam, a plurality of pistons rigidly connected with each of said reciprocable members and extending into said axially aligned cylinders, passages connecting the cylinders of each opposing set, and means for controlling the flow of fluid through said passages to oppose the action of the piston members.

3. In a variable speed transmission, a driving member having a cam, a driven member having a plurality of longitudinally moveable piston members operatively engaging said cam and moved thereby in an axial direction, a plurality of opposed cylinders engaging said piston members, passages arranged at each end of the driven member and connecting the cylinders at their outer ends, a cylindrical valve chamber interposed in said passages and forming a common communicating connection therebetween, and piston valves slidably arranged in said valve chamber adapted to be operated to control the flow of fluid through said passages.

4. In a variable speed transmission, a driving member having a cam, a driven member having a plurality of moveable piston members operatively engaging said cam, a plurality of cylinders engaging said piston members, passages at each end of the driven member connecting the outer ends of said cylinders, a cylindrical chamber connected with said passages, a plunger operating in said chamber controlling the opening and closing of said passages, and means for automatically operating said plunger to effect an equalization of torque between the driving and driven members.

5. In a variable speed transmission, a driving member having a cam, a driven member having a plurality of piston members operatively engaging said cam, a plurality of cylinders in each end of said driven member engaging said piston members, passages connecting the cylinders of each end of the driven member, a valve chamber communicating with said passages, a plunger in said valve chamber controlling said passages and having at one end an opening constantly communicating with the cylinders, and a coil compression spring arranged in said valve chamber and holding said plunger to its closed position.

6. In a variable speed transmission, a driving member having an internally arranged circumferential cam formed with a longitudinal throw, a driven member formed with a pair of rotatably mounted spaced members each having a plurality of radially paired cylinders, the cylinders of one member being arranged in alignment with cylinders of the other, reciprocable members having pistons extending into the opposing cylinders of each of said driven members and operatively engaging said cam to be reciprocated thereby, passages connecting the outer cylinders of each of said members, means for controlling the fluid flow through said passages, means for feeding fluid to the inner cylinders, passages in said piston members connecting the inner cylinders with the outer cylinders, and valves controlling said passages to prevent a back flow of fluid to the inner cylinders from the outer ones.

7. In a variable speed transmission, a driving member having a cam formed with a longitudinal throw, a driven member formed with a pair of spaced elements each having a plurality of cylinders aligned with each other, passages connecting the outer ends of the cylinders of each of said driven elements, valve means for controlling the flow of fluid through said passages, and reciprocable members engaging said cam having piston extensions operating in said cylinders and having a restricted orifice extending therethrough forming a metering communicating passage between opposing cylinders.

8. In a variable speed transmission, a driving member having a cam, a driven member having a plurality of piston members operatively engaging said cam, a plurality of opposed cylinders engaging said pistons, passages in each end of the driven member connecting the outer ends of said cylinders, a cylinder axially arranged in said driven member, a plunger operating in said cylinder and having valve ends adapted to close the passages communicating with said cylinder, and manually operable means for operating said plunger to move the valve means to regulate the bye-passing of fluid between said cylinders.

9. In a variable speed transmission, a driving member in the form of a circular shell structure having an internally arranged circumferential cam groove formed with a longitudinal throw, a casing enclosing said driving member having a bearing, a driven member journalled in said bearing at one end and journalled at the other end in the driving member, a pair of circular members secured together on said driven member and spaced apart and each having a plurality of cylinders arranged in aligned pairs, pistons extending between said spaced members and operating in said cylinders and having extensions engaging the cam groove in the driving member, a plunger arranged axially of the driven member, passages connecting the cylinders of each member of the driven member and controlled by said plunger, and means for operating said plunger.

HERALD B. GREENING.
JAMES W. GALLOWAY.